United States Patent Office 2,865,838
Patented Dec. 23, 1958

2,865,838

CONDITIONING HYDROCARBON STOCKS FOR CATALYTIC REACTION

Ivor W. Mills, Glenolden, Pa., assignor to Sun Oil Company, Philadelphia, Pa., a corporation of New Jersey No Drawing. Application August 24, 1954
Serial No. 451,986

3 Claims. (Cl. 208—90)

This invention relates to the removal of organo-metallic compounds from hydrocarbon stocks preparatory to subjecting the stocks to catalytic conversion.

Catalysts used in hydrocarbon conversion processes, such as in catalytic cracking or reforming, undergo changes during use which result in loss of catalyst selectivity or activity for promoting the type of reaction desired. These deleterious effects can be attributed in many cases to various naturally occurring organo-metallic compounds which are present in the hydrocarbon charge stock in very small amounts. The occurrence of organo-metallic compounds in petroleum varies considerably depending upon the crude source, so that some crude oils may have little if any deleterious metallic components while others may have components of this type which cause rapid deactivation of the catalyst. Metals which have been found in petroleum include vanadium, arsenic, nickel, copper and iron, and they evidently occur in the form of organic compounds at least some of which are sufficiently volatile so that metallic components will be present in fractions distilled from the crude oil. See "Mechanism of Occurrence of Metals in Petroleum Distillates" by Woodle et al., Ind. Eng. Chem., vol. 44, No. 11, pages 2591–2596 (1952). It has been shown that the occurrence of such metallic components in charge stocks which are subjected to catalytic conversion causes deactivation of the catalyst or loss of selectivity with respect to the type of reactions desired. See "Aging of Cracking Catalysts" by Mills, Ind. Eng. Chem., vol. 42, No. 1, pages 182–187 (1950).

In accordance with the present invention, deleterious organo-metallic compounds are removed from hydrocarbon charge stocks prior to catalytic conversion by contacting the charge stocks with solid material comprising a calcined mixture of phosphoric acid and siliceous carrier. This solid material is widely used as a catalyst for polymerizing olefins and is commonly referred to in the art as "solid phosphoric acid catalyst."

The contact treatment can be effected by filtering the hydrocarbon charge stock through a body of the solid phosphoric acid catalyst, or by contacting the charge stock with the solid phosphoric acid catalyst in any other suitable manner, either continuously or batchwise. During the contact treatment, temperature and pressure conditions are maintained such that substantial vaporization of the hydrocarbon material being treated is prevented. Contact conditions are also regulated to prevent substantial vaporization and loss of water from the solid phosphoric acid catalyst since excessive dehydration of this catalyst material results in crumbling and breaking up of the solid phosphoric acid at normal contact conditions. A relatively low treating temperature such as ordinary room or storage tank temperature may be used, or higher temperatures may be employed if the hydrocarbon stock is too viscous for convenient handling at ordinary room or storage temperatures. Normally, contact temperatures in the range of about 50° F. to 350° F. may be used with atmospheric pressures while at higher temperatures e. g. 350° F. to about 500° F., higher pressures are needed to maintain the hydrocarbon material in the liquid phase and/or to prevent water loss from the solid phosphoric acid catalyst.

The solid phosphoric acid contact material used in this invention is widely used to promote olefin polymerization. This solid material is normally prepared by mixing phosphoric acid with siliceous adsorptive material such as kieselguhr in proportions such that the phosphoric acid comprises a predominance of the resulting mixture by weight. This mixture is then calcined to form a solid mass which, after grinding and sizing, is suitable for use in the present invention.

In practicing the present invention, hydrocarbon charge stock containing an organo-metallic component, such as a vanadium, arsenic, nickel, copper, or iron component, is contacted prior to catalytic conversion with solid phosphoric acid catalyst, thereby to remove the deleterious component. The charge stock is treated in the liquid phase and the contact is conveniently effected by filtering the charge stock through a bed of the solid phosphoric acid material. The treated stock is then subjected to catalytic conversion in the presence of a suitable catalyst. The catalytic conversion can be conducted for a much longer time without replacement of the catalyst through practice of the present invention.

The hydrocarbon charge stocks so treated may be residuum cracking stocks as well as normal catalytic reforming or cracking stocks such as naphtha, gas oil, and the like. The present invention may be used with particular advantage prior to catalytic reforming with a platinum catalyst or prior to catalytic cracking with such catalysts as silica-alumina, or the like. This invention may be used to advantage prior to catalytic conversion with any catalyst which is subject to deactivation due to the presence of deleterious organo-metallic components in the conversion charge stock.

In a specific example of the invention a crude mineral oil containing vanadium and nickel in unusually high amounts was filtered through a bed of solid phosphoric acid catalyst at a space velocity of 1 volume of liquid feed per volume of solid phosphoric acid per hour. The contact was conducted at about 212° F. The vanadium content of the oil was reduced from 232 p. p. m. to 130 p. p. m., while the nickel content was reduced from 53 to 18 p. p. m.

In my copending application Serial No. 331,926 I disclose and claim removing deleterious organo-metallic components from catalytic conversion charge stocks by contacting the charge stocks with an acidic adsorbent selected from the class consisting of silica gel, alumina gel, and acid treated adsorptive clay. The treatment of this invention is separate and distinct from that disclosed in said copending application. The solid phosphoric acid catalyst material used in this invention is not an acidic adsorbent as contemplated in said copending application. Solid phosphoric acid does not possess the characteristics of an adsorbent; the adsorptive portion of this solid material serves as a carrier for the phosphoric acid and is predominantly saturated with this acid.

I claim:

1. In the catalytic conversion of a petroleum stock containing organo-metallic components deleterious to the catalyst, the steps which comprise contacting said stock in liquid phase with solid phosphoric acid catalyst at a temperature in the range of from 50° F. to 350° F., and thereafter directly subjecting said stock containing a reduced amount of said deleterious organo-metallic components to a catalytic conversion operation selected from the group consisting of a catalytic cracking operation and a catalytic reforming operation.

2. Method according to claim 1 wherein said catalytic conversion operation is a catalytic cracking operation.

3. Method according to claim 1 wherein said catalytic conversion operation is a catalytic reforming operation.

References Cited in the file of this patent

UNITED STATES PATENTS

| | | |
|---|---|---|
| 2,384,339 | Read | Sept. 4, 1945 |
| 2,682,496 | Richardson et al. | June 29, 1954 |
| 2,717,230 | Murray et al. | Sept. 6, 1955 |
| 2,782,143 | Bicek | Feb. 19, 1957 |